United States Patent Office.

JOHN W. TULLY, OF DELANO, PENNSYLVANIA.

Letters Patent No. 99,610, dated February 8, 1870.

IMPROVED COMPOSITION OR FILLING FOR COACH-PAINTERS.

The Schedule referred to in these Letters Patent and making part of the same.

I, JOHN W. TULLY, of Delano, county of Schuylkill, State of Pennsylvania, have invented an Improved Filling for Coach-Painters, &c., of which the following is a specification.

Nature and Object of the Invention.

My invention consists in introducing powdered pumice-stone into coach-makers' filling-composition, so that in rubbing the coats of the same with solid pumice-stone, the latter may be prevented from becoming choked, and may be maintained in that hard condition which insures the best results in reducing the surface.

My invention further consists of a cheap and effective filling-composition, composed of the ingredients described hereafter.

General Description.

In carrying out my invention, I prefer to use about sixty per cent. of finely-ground slate, about thirty per cent. of white lead, and about ten per cent. of finely-pulverized pumice-stone; these ingredients to be thoroughly mixed in a solution composed of about seventy-five per cent. of japan varnish, in about twenty-five per cent. of turpentine, the powdered ingredients being mixed with so much of the solution as will render the mixture of the proper consistency for applying it to coach or car-bodies, and other objects.

The composition thus prepared is applied on the priming, in the usual manner, one, two, or more coats being applied, and then rubbed down with lump pumice-stone, used with sufficient water.

The operation of applying filling-composition to coach-bodies is one of a tedious character, owing to the rapid choking of the pores of the pumice-stone, by which the surface of the latter is rendered dull and ineffective as a rubbing-medium, and the stone must either be scraped or replaced with a new one before the process can be continued.

I have found, however, that by introducing into the composition powdered pumice-stone, the latter has a tendency to prevent the choking of the solid rubbing-stone, and to maintain the surface of the latter in the sharp condition necessary for rubbing-purposes. A saving is thus effected, both in time and material, by the adoption of my invention.

The powdered pumice-stone can be introduced, with advantageous results, into any of the filling-compositions now in use; but I have found it of especial service when used in combination with ground slate and white lead, as described above; and these ingredients, when mixed with the varnish and turpentine, form a very cheap and substantial filling, independently of the advantages obtained by the peculiar properties of the powdered pumice-stone.

Claims.

1. The employment, in coach-filling, of powdered pumice-stone, for the purpose specified.

2. Coach-filling composition, composed of ground slate, white lead, or its equivalent, powdered pumice-stone, and varnish, as set forth.

In testimony whereof, I have signed my name to this specification, in the presence of two subscribing witnesses.

JOHN W. TULLY.

Witnesses:
JOHN WHITE,
HARRY SMITH.